US008756247B2

(12) United States Patent
Kuo et al.

(10) Patent No.: US 8,756,247 B2
(45) Date of Patent: Jun. 17, 2014

(54) SYSTEM AND METHOD FOR SHARING ONLINE STORAGE SERVICES AMONG MULTIPLE USERS

(75) Inventors: Yen-Hung Kuo, Taipei (TW); Han-Chao Lee, Taipei (TW); Phoenix Lee, Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 12/962,659

(22) Filed: Dec. 8, 2010

(65) Prior Publication Data

US 2012/0110005 A1     May 3, 2012

(30) Foreign Application Priority Data

Nov. 1, 2010   (TW) ................................ 99137489 A

(51) Int. Cl.
  *G06F 7/04*       (2006.01)
  *G06F 17/30*      (2006.01)
(52) U.S. Cl.
  USPC ........... 707/770; 707/694; 707/705; 707/758; 707/812
(58) Field of Classification Search
  USPC ........... 707/999.009, 999.01, 999.1, 999.101, 707/999.102, 999.107, 694, 705, 758, 769, 707/770, 781, 803, 812
  See application file for complete search history.

(56) References Cited

U.S. PATENT DOCUMENTS

| 7,472,178 | B2 | 12/2008 | Lisiecki |
| 7,587,471 | B2 | 9/2009 | Yasuda et al. |
| 7,720,935 | B2 | 5/2010 | Anantha |
| 2010/0169442 | A1 | 7/2010 | Liu et al. |
| 2012/0072465 | A1* | 3/2012 | McGowan et al. ........... 707/803 |
| 2012/0072541 | A1* | 3/2012 | Carls et al. .................... 709/219 |
| 2012/0117110 | A1* | 5/2012 | Amidon et al. ............... 707/770 |

FOREIGN PATENT DOCUMENTS

| CN | 1368811 | 9/2002 |
| CN | 1744557 | 3/2006 |
| CN | 101355476 | 1/2009 |
| CN | 101587475 | 11/2009 |
| CN | 101887349 | 11/2010 |
| TW | 561735 | 11/2003 |
| TW | 200726125 | 7/2007 |

OTHER PUBLICATIONS

"Office Action of China Counterpart Application", issued on Jan. 6, 2014, p. 1-p. 6.
"Office Action of Taiwan Counterpart Application", issued on Jan. 8, 2014, p. 1-p. 8.

* cited by examiner

*Primary Examiner* — Bruce Moser
(74) *Attorney, Agent, or Firm* — Jianq Chyun IP Office

(57) ABSTRACT

A system and a method for sharing online storage services among multiple users are provided. The system includes a user communication interface, a file processing module, and an online storage communication interface. The user communication interface is configured to connect to a client end corresponding to a first user. When the user communication interface receives a file upload request and a corresponding upload file from the client end, the file processing module searches for a personal online storage of the first user and a shared online storage of at least one related user of the first user and determines to upload the upload file to a partial online storage of the personal online storage and the shared online storage. The online storage communication interface transfers the upload file to the partial online storage determined by the file processing module.

8 Claims, 8 Drawing Sheets

| User group 1<br>Sharing rule set 1 | User group 2<br>Sharing rule set 2 | User group 3<br>Sharing rule set 3 | User group 4<br>Sharing rule set 4 |
|---|---|---|---|
| Sub space 1<br>(25GB) | Sub space 2<br>(25GB) | Sub space 3<br>(25GB) | Sub space 4<br>(25GB) |

Personal online storage (100GB)

FIG. 3

| User group 1<br>System preset sharing rule set 1 | User group 1<br>User customized sharing rule set 1 | User group 2<br>System preset sharing rule set 2 | User group 3<br>System preset sharing rule set 3 |
|---|---|---|---|
| Sub space 1<br>(25GB) | Sub space 2<br>(25GB) | Sub space 3<br>(25GB) | Sub space 4<br>(25GB) |

Personal online storage (100GB)

FIG. 4

| User group 1<br>System preset sharing rule set 1<br><br>Priority1<br><br>User group 2<br>System preset sharing rule set 2<br>Priority2 | User group 1<br>User customized sharing rule set 1<br><br>Priority1<br><br>User group 3<br>System preset sharing rule set 3<br>Priority2 | User group 2<br>System preset sharing rule set 2 | User group 3<br>System preset sharing rule set 3 |
|---|---|---|---|
| Sub space 1<br>(25GB) | Sub space 2<br>(25GB) | Sub space 3<br>(25GB) | Sub space 4<br>(25GB) |

Personal online storage (100GB)

FIG. 5

SYSTEM AND METHOD FOR SHARING ONLINE STORAGE SERVICES AMONG MULTIPLE USERS

CROSS-REFERENCE TO RELATED APPLICATION

This application claims the priority benefit of Taiwan application serial no. 99137489, filed on Nov. 1, 2010. The entirety the above-mentioned patent application is hereby incorporated by reference herein and made a part of specification.

BACKGROUND OF THE INVENTION

1. Field of the Invention

The invention generally relates to a system and a method for sharing an online storage space among multiple users, and more particularly, to a system and a method that allow a plurality of users to share a plurality of online storage services.

2. Description of Related Art

Cloud computing has been increasingly adopted along with the rapid development of computer technologies and the Internet. Cloud computing is a technology that coordinates the operations of different computer systems through a network or allows a computer system to receive services from remote hosts through network connections. A cloud storage service allows a user to store data into the space provided by a remote host through a network, so that the limitation on local hardware storage is broken through and file portability is increased.

To be specific, presently, a user can access online storages provided by different online storage service providers by signing up for free or paid accounts. However, because these online storages provided by different service providers are not connected or shared with each other, the user has to manage these online storages individually. When the user needs to move a file between different online storages, the user has to download the file to a local device first and then upload it to the other online storage.

In addition, because the user has to pass the network authentication to use a online storage, the user has to give his or her account number and password away in order to share the online storage with others. As a result, file security is greatly reduced, and data stored in the online storage could be misappropriated.

SUMMARY OF THE INVENTION

Accordingly, the invention is directed to a system and a method for sharing online storage services among multiple users, wherein online storages signed up by the users at different online storage providers are integrated, and the users are allowed to share the online storages provided by different online storage providers without jeopardizing the security of files.

The invention is directed to a system and a method for sharing online storage services among multiple users, wherein a user is allowed to manage online storages provided by different online storage providers through a single interface and use online storages shared by other users, so that the capacity limitation of the online storage provided by a single online storage provider is eliminated.

The invention provides a system for sharing online storage services among multiple users. The system includes a user communication interface, a file processing module, and an online storage communication interface. The user communication interface is configured to connect to a client end corresponding to a first user. The file processing module is coupled to the user communication interface. When the user communication interface receives a file upload request and a corresponding upload file from the client end, the file processing module searches for a personal online storage of the first user and a shared online storage of at least one related user of the first user and determines to upload the upload file to a partial online storage of the personal online storage and the shared online storage. The online storage communication interface is coupled to the file processing module. The online storage communication interface transfers the upload file to the partial online storage determined by the file processing module.

The invention also provides a method for sharing online storage services among multiple users. The method is adaptable to a online storage service system. In the present method, a file upload request and a corresponding upload file are received from a client end corresponding to a first user. Then, a personal online storage of the first user and a shared online storage of at least one related user of the first user are searched. After determining to upload the upload file to a partial online storage of the personal online storage and the shared online storage, the upload file is transferred to the determined partial online storage.

As described above, in the invention, the online storages signed up by a user at different online storage providers are managed through a single interface, so as to overcome the capacity limitation of online storage provided by a single online storage provider, and different users are allowed to share their online storages. Thereby, the flexibility and reliability in using online storages are improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a diagram illustrating the correspondence between sub spaces, user groups, and sharing rule sets according to an embodiment of the invention.

FIG. 4 is a diagram illustrating the correspondence between sub spaces, user groups, and sharing rule sets according to another embodiment of the invention.

FIG. 5 is a diagram illustrating the correspondence between sub spaces, user groups, and sharing rule sets according to yet another embodiment of the invention.

DESCRIPTION OF THE EMBODIMENTS

Figure 1:
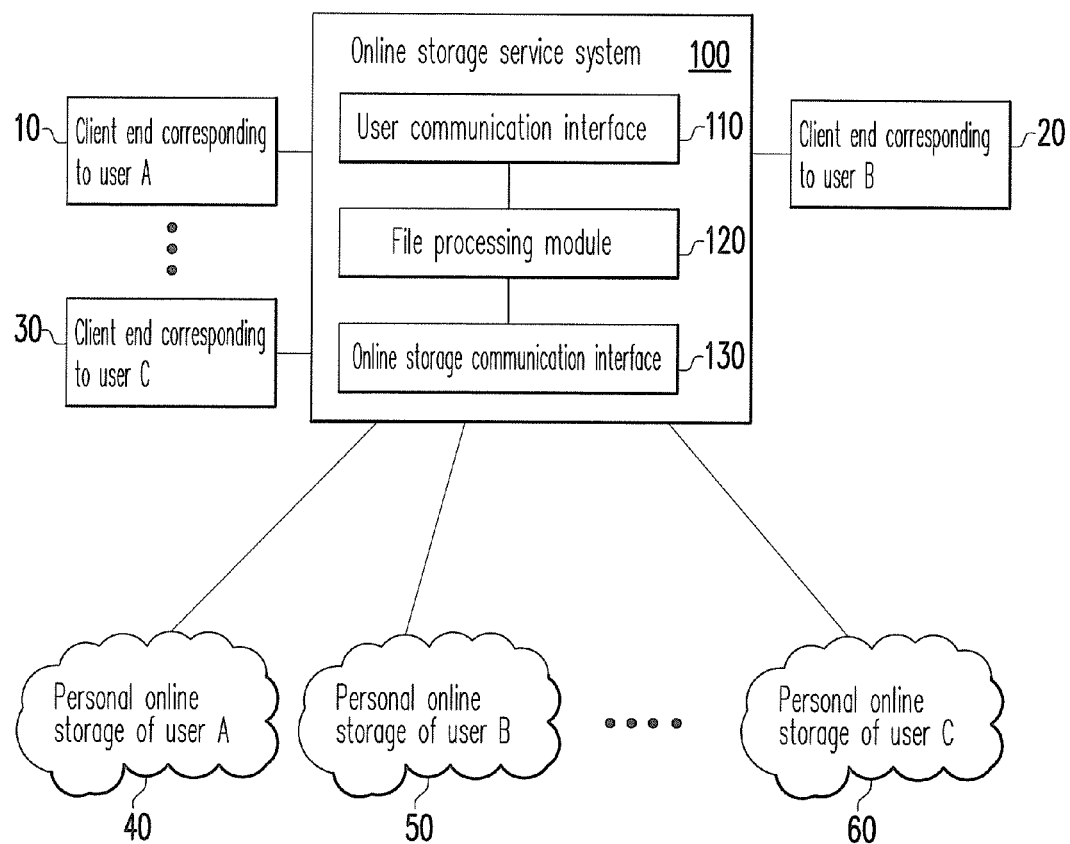
FIG. 1 is a block diagram of a system for sharing online storage services among multiple users according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a system for sharing online storage services among multiple users according to an embodiment of the invention. Referring to FIG. 1, the online storage service system 100 includes a user communication interface 110, a file processing module 120, and an online storage communication interface 130. Through the online storage service system 100, a user possessing several online storages provided by different online storage providers can manage these online storages as a whole and can share online storages with other users without jeopardizing the security of the user's own data.

The user communication interface 110 is configured to connect to a client end corresponding to a user (for example, a client end 10 corresponding to a user A, a client end 20 corresponding to a user B, or a client end 30 corresponding to a user C). In the present embodiment, the user communication interface 110 may be a web-based distributed authoring and versioning (WebDAV) server, a file transfer protocol (FTP) server, a hypertext transfer protocol (HTTP) server, a client-server model server, or any other distributed file communication protocol server. Accordingly, the user can connect and log into the online storage service system 100 from the client end through a connection software supporting WebDAV, FTP, or HTTP, a connection software developed based on the client-server model, or a web-based file manager.

In the present embodiment, the personal online storage signed up by each user (for example, the personal online storage 40 of the user A, the personal online storage 50 of the user B, or the personal online storage 60 of the user C) may be provided by one or more online storage providers. The online storage communication interface 130 is configured to connect to the online storage providers for providing the online storage services. In the present embodiment, the online storage communication interface 130 may be a connection software supporting WebDAV, FTP, or HTTP, or an external storage application program interface, and which can access a personal online storage signed up by the user after connecting to a online storage provider.

The file processing module 120 is coupled to the user communication interface 110 and the online storage communication interface 130. When the user communication interface 110 receives a file upload request and a corresponding upload file from the client end, the file processing module 120 searches for the personal online storage of the user and a shared online storage of at least one related user and determines to upload the upload file to a partial online storage of the personal online storage and the shared online storage. Herein the partial online storage may be any partial online storage of the combined personal online storage and shared online storage.

Additionally, the file processing module 120 may further perform a file rename process and/or file splitting/joining processes, and the online storage communication interface 130 may further perform file encryption/decryption processes and/or file compression/decompression processes.

In other embodiments, regarding each user who has signed up and obtained access rights to the online storage service system 100, the file processing module 120 integrates more than one personal online storage signed up by the user and integrates shared online storages of more than one related user. When the user uploads a file to the online storage, the file processing module 120 determines which online storages (i.e., the partial online storage) are used for storing the file and determines whether to split the file into a plurality of file segments or rename the file (or the file segments) before it is uploaded. When the user downloads a file from the online storage, the file processing module 120 also determines which online storage(s) should be connected to obtain the entire file. To be specific, the online storage service system 100 allows each user to set up one or more user groups, and each user group has its own sharing rule set (composed of one or more sharing rules). Users belonging to the same user group are related users, and related users can share their online storages with each other. Thus, when the file processing module 120 determines the online storages to which a file is uploaded, besides the personal online storage of the user, the file processing module 120 may also upload the file or file segments to shared online storages provided by other related users. In other words, the user may access an online storage larger than the user's personal online storage. The capacity of the extra online storage is determined by the sharing rule set of the user group corresponding to the user.

Through the operations of the user communication interface 110, the file processing module 120, and the online storage communication interface 130, the online storage service system 100 brings a high flexibility in using online storage to its users. For example, when the file to be uploaded by a user is too large therefore cannot be stored into the online storage provided by a single online storage provider, the online storage service system 100 automatically splits the file into a plurality of file segments and then stores the file segments respectively into several online storages accessible to the user (i.e., any partial online storage of the combined personal online storage and shared online storages). In addition, by setting up the user groups, each user can configure the sharing rule sets and the correspondence between the personal online storage of the user and the user groups, so that the personal online storage of the user can be shared with other related users in the same user group and the shared online storages provided by other related users can be used. Thereby, the purpose of online storage sharing can be accomplished. For example, a user can configure a specific proportion or a specific amount of the user's personal online storage as a shared online storage of a specific user group. In other words, a user may have backup data in online storages of other users (for example, provided by different online storage providers) so that the security and reliability of storing data in the online storage are improved.

Figure 2:
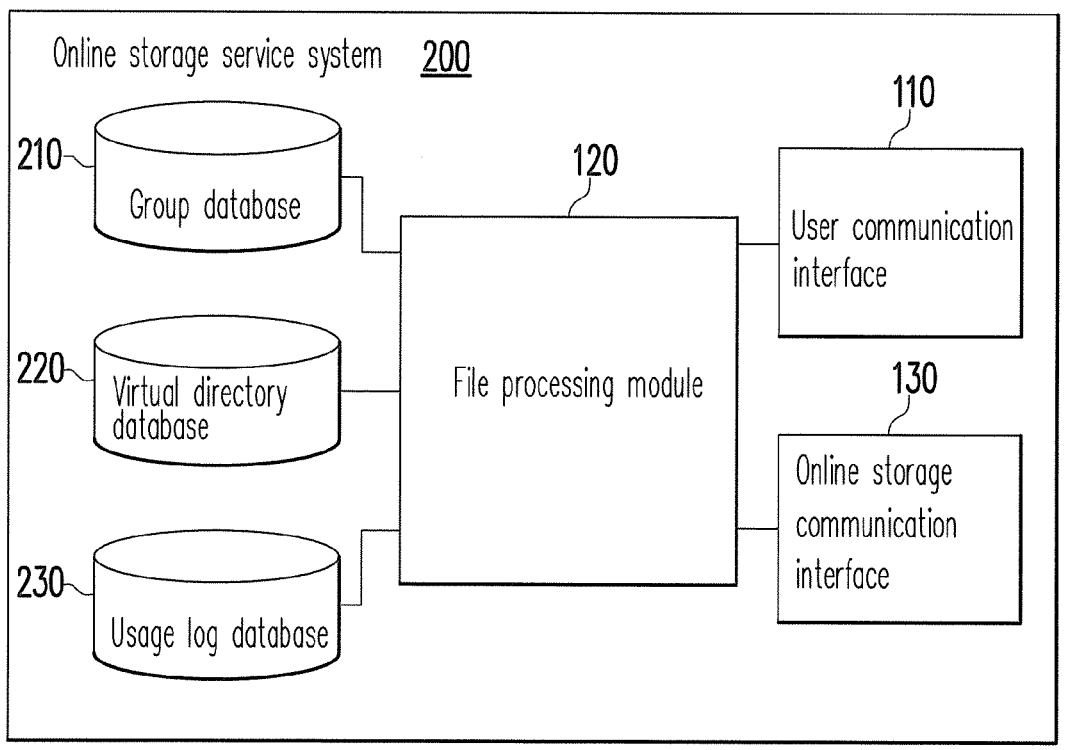
FIG. 2 is a block diagram of a system for sharing online storage services among multiple users according to another embodiment of the invention.

FIG. 2 is a block diagram of a system 200 sharing online storage services among multiple users according to another embodiment of the invention. Referring to FIG. 2, the online storage service system 200 includes a user communication interface 110, a file processing module 120, an online storage communication interface 130, a group database 210, a virtual directory database 220, and a usage log database 230. The user communication interface 110, the online storage communication interface 130, the group database 210, the virtual directory database 220, and the usage log database 230 are all coupled to the file processing module 120. The user communication interface 110, the file processing module 120, and the online storage communication interface 130 may be implemented as servers or virtual machines, and the group database 210, the virtual directory database 220, and the usage log database 230 may be any kind of storage device.

The group database 210 records at least one user group corresponding to each user, the correspondence between a personal online storage of each user and the corresponding user groups, and a sharing rule set of each user group. Users in the same user group are related users, and the file processing module 120 searches for a shared online storage provided by one or more related users according to the sharing rule set of each user group and the correspondence between the personal online storage of the user and the user groups. A sharing rule set may be a system preset sharing rule set or a user customized sharing rule set. In other words, in the online storage service system 200, each user group includes a plurality of users, and different user groups may include the same or completely different users.

The virtual directory database 220 records a virtual directory of a first user (i.e., the online storages for storing files uploaded by the first user), and the usage log database 230 records a usage log of the first user. The file processing module 120 determines a partial online storage of the personal online storage and the shared online storage according to the usage log and the virtual directory. Then, the file processing module 120 updates the virtual directory according to the partial online storage and stores the updated virtual directory into the virtual directory database 220.

When the user communication interface 110 receives a file download request from a client end, the file processing module 120 finds the online storage in which the corresponding file is currently stored according to the virtual directory, wherein the online storage may be one or more source online storages. The file processing module 120 downloads the file through the online storage communication interface 130 and transfers the file to the client end through the user communication interface 110.

As to a user possessing a personal online storage, regardless of whether the personal online storage is provided by one or more online storage providers or whether the personal online storage is free or paid, the client end corresponding to the user needs not to be respectively connected to the systems or communication interfaces of different online storage providers. Instead, the client end is connected to the online storage service system 200 through the user communication interface 110, and the client end can configure one or more corresponding user groups after signing up and obtaining access rights to the online storage service system 200 so that the online storage service system 200 can manage the personal online storage of the user.

To be specific, after the user sets up the corresponding user groups, the group database 210 records these user groups and the correspondence between the personal online storage of the user and the corresponding user groups. Besides, the group database 210 records the sharing rule set of each user group.

In some embodiments, the user's personal online storage is partitioned into a plurality of sub spaces, and the online storage service system 200 specifies that the user groups corresponding to the user and the sub spaces in the personal online storage have to have a one-on-one relationship. Namely, in the personal online storage of a user, each user group is corresponded to only one sub space instead of multiple sub spaces. For example, if the user sets up the corresponding user groups 1-4 and the personal online storage of the user is partitioned into sub spaces 1-4, in an embodiment, the correspondence between the user groups 1-4 and the sub spaces 1-4 is as shown in FIG. 3, wherein the user group 1 has a sharing rule set 1, the user group 2 has a sharing rule set 2, the user group 3 has a sharing rule set 3, and the user group 4 has a sharing rule set 4. The sharing rules in the same sharing rule set cannot conflict with each other.

In some other embodiments, the online storage service system 200 specifies that each user group may be corresponded to one or more sub spaces. In other words, in the personal online storage of a user, the online storage service system 200 allows multiple sub spaces to be corresponded to the same user group. For example, if the user sets up the corresponding user groups 1-3 and the personal online storage of the user is partitioned into sub spaces 1-4, in an embodiment, the correspondence between the user groups 1-3 and the sub spaces 1-4 is as shown in FIG. 4, wherein the user group 1 is corresponding to the sub spaces 1 and 2, the user group 2 is corresponding to the sub space 3, and the user group 3 is corresponding to the sub space 4. As shown in FIG. 4, regarding the sub spaces 1 and 2 corresponding to the same user group 1, the sub space 1 conforms to the system preset sharing rule set 1, and the sub space 2 conforms to the user customized sharing rule set 1. It should be noted that a user customized sharing rule set has to be looser than a system preset sharing rule set of the same user group, and the rules in the same sharing rule set cannot conflict with each other. For example, if a sharing rule in the system preset sharing rule set of a user group specifies that 50% of the space has to be exchanged with other related users in the same user group, then a sharing rule in the user customized sharing rule set of the user group may specify that 80% (or other percentage greater than 50%) of the space has to be exchanged with other related users.

In yet some other embodiments, the personal online storage of a user is partitioned into a plurality of sub spaces, and when the user sets up more than one corresponding user groups, the online storage service system 200 specifies that each sub space in the personal online storage of the user may be corresponding to one or more user groups, and each user group has a sharing rule set (may be a system preset sharing rule set or a user customized sharing rule set, and rules in the same sharing rule set cannot conflict with each other). When a sub space among the sub spaces is corresponding to multiple user groups, a priority is set for the file processing module 120 to search for a shared online storage according to the sharing rule set of a user group. Assuming that the user sets up the corresponding user groups 1-3 and the personal online storage of the user is partitioned into sub spaces 1-4, the correspondence between the sub spaces and the user groups is as shown in FIG. 5, wherein the sub space 1 is corresponding to the user group 1 (having a system preset sharing rule set 1) and the user group 2 (having a system preset sharing rule set 2). In order to avoid conflict between the system preset sharing rule set 1 and the system preset sharing rule set 2, the user has to set priorities for the user groups 1 and 2. In the present embodiment, the priority 1 of the user group 1 is higher than the priority 2 of the user group 2. Accordingly, when the file processing module 120 searches for a shared online storage according to the system preset sharing rule sets of the user groups 1 and 2 corresponding to the sub space 1, it has to refer to the system preset sharing rule set 1 of the user group 1 having a higher priority. If the system preset sharing rule set 2 does not conflict with the system preset sharing rule set 1, the file processing module 120 then refers to the system preset sharing rule set 2 of the user group 2 having a lower priority.

In foregoing embodiments, the sharing rules in a sharing rule set include one or a combination of a sharing period rule, a sharing member rule, a sharing manner rule (for example, space sharing, space exchanging, or space giving), a shared space capacity rule, a file privacy rule, and a sharing schedule rule.

It has to be noted that the division of the sub spaces described in foregoing embodiment is only an example, and the capacity of each sub space is not limited in the invention.

As described above, in the online storage service system 200, the users in each user group, the correspondence between the sub spaces in the personal online storage of each user and the user groups corresponding to the user, and the sharing rule set of each user group can be determined based on the information recorded in the group database 210.

Figure 6:
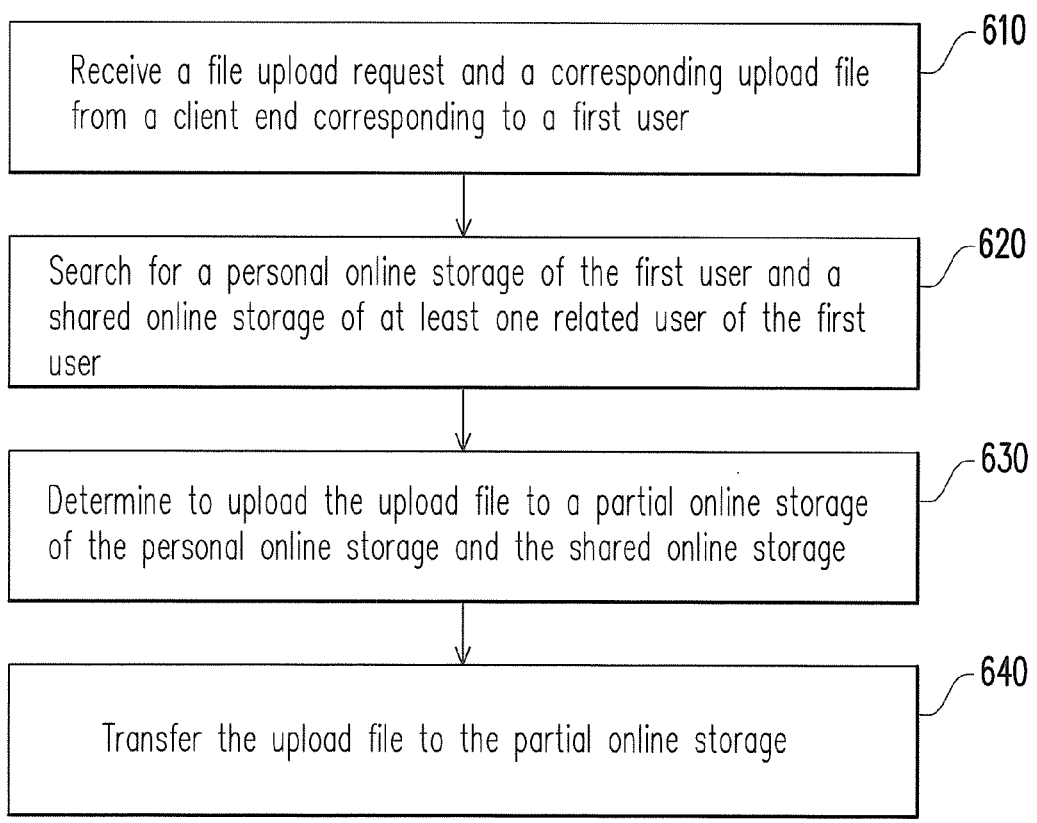
FIG. 6 is a flowchart of a method for sharing online storage services among multiple users according to an embodiment of the invention.

FIG. 6 is a flowchart of a method for sharing online storage services among multiple users according to an embodiment of the invention. Below, the operation of the online storage service system 100 when a user (referred to as first user thereinafter) is about to upload a file to the online storage through the online storage service system 100 will be described in detail with reference to FIG. 1 and FIG. 6.

First, the first user connects to the user communication interface 110 of the online storage service system 100 through a client end connection software supporting WebDAV, FTP, or HTTP, a connection software developed based on the client-server model, or a web-based file manager at a client end corresponding to the first user, and the first user then inputs his or her account number and password to log into the online storage service system 100. Then, the first user selects an upload file in a storage device at the client end. In step 610, the user communication interface 110 receives a file upload request and the corresponding upload file from the client end and relays the upload file to the file processing module 120.

Next, in step 620, the file processing module 120 searches for a personal online storage of the first user and a shared online storage (may be provided by one or more online storage providers) of at least one related user of the first user. To be specific, the file processing module 120 searches for the shared online storages provided by all the related users in each user group corresponding to the first user according to the sharing rule set of each user group corresponding to the first user and the correspondence between the personal online storage of the first user and the corresponding user groups.

Thereafter, in step 630, the file processing module 120 determines to upload the upload file to a partial online storage of the personal online storage and the shared online storage.

In other embodiments, as shown in FIG. 2, the virtual directory database 220 records a virtual directory (may be a virtual directory in the tree structure) of each user in the online storage service system 200, wherein the virtual directory records the online storages for storing all the files uploaded by the user. The usage log database 230 records a usage log (for example, a file access habit) of each user in the online storage service system 200. The file processing module 120 obtains the virtual directory and the usage log of the first user respectively from the virtual directory database 220 and the usage log database 230 and determines to upload the upload file to the personal online storage and/or the shared online storage according to the usage log and the virtual directory. For example, the file processing module 120 analyzes the preference of the first user according to the usage log thereof and determines the significance and access rate of the upload file. After that, the file processing module 120 determines where to store the upload file according to the capacities of available spaces in the personal online storage and the shared online storage, the upload speed, and security. In some other embodiments, the file processing module 120 stores important files frequently accessed by the user into paid online storages with relatively higher security.

In other embodiments, the file processing module 120 may store an entire upload file into a personal online storage or a shared online storage provided by a single online storage provider. Or, the file processing module 120 may also store a complete upload file respectively into two online storages (may be a personal online storage and/or shared online storages) provided by different online storage providers so as to achieve a file backup function.

Additionally, the file processing module 120 may further store an upload file into personal online storage and/or shared online storage provided by different online storage providers. In this case, the file processing module 120 performs a file splitting process on the upload file to generate a plurality of file segments and respectively determines which online storage each file segment is uploaded to. After that, the file processing module 120 updates the virtual directory of the first user according to the determined online storages (i.e., the partial online storage) to record the online storages in which the upload file (or all the file segments of the upload file) is recorded and then stores the updated virtual directory into the virtual directory database 220. Besides, when a online storage selected by the file processing module 120 for storing the upload file has special requirement to the file name or the upload file needs to be split, the file processing module 120 performs a file rename process on the upload file or the file segments thereof.

Finally, in step 640, the online storage communication interface 130 transfers the upload file to the partial online storage determined by the file processing module 120 according to instructions of the file processing module 120.

In some other embodiments, the online storage service system 100 further includes an internal storage device (not shown) for temporarily storing the file to be uploaded by the user. Thus, after the user logs into the online storage service system 100 and uploads a selected upload file to the online storage service system 100, the user terminates the connection between the client end and the online storage service system 100, and the online storage service system 100 continues with the file uploading operation.

In yet some other embodiments, when the user is not connected to the online storage service system 100, the file processing module 120 determines whether a file stored in a specific online storage needs to be moved to another online storage according to the usage log of each user and the rates and securities of the personal online storage and shared online storages accessible to each user at regular intervals. If the file processing module 120 determines to move a file, the file processing module 120 modifies the virtual directory of the user correspondingly. Accordingly, when next time the user connects to the online storage service system 100, the latest storage position of the file can be determined according to the virtual directory.

Figure 7:
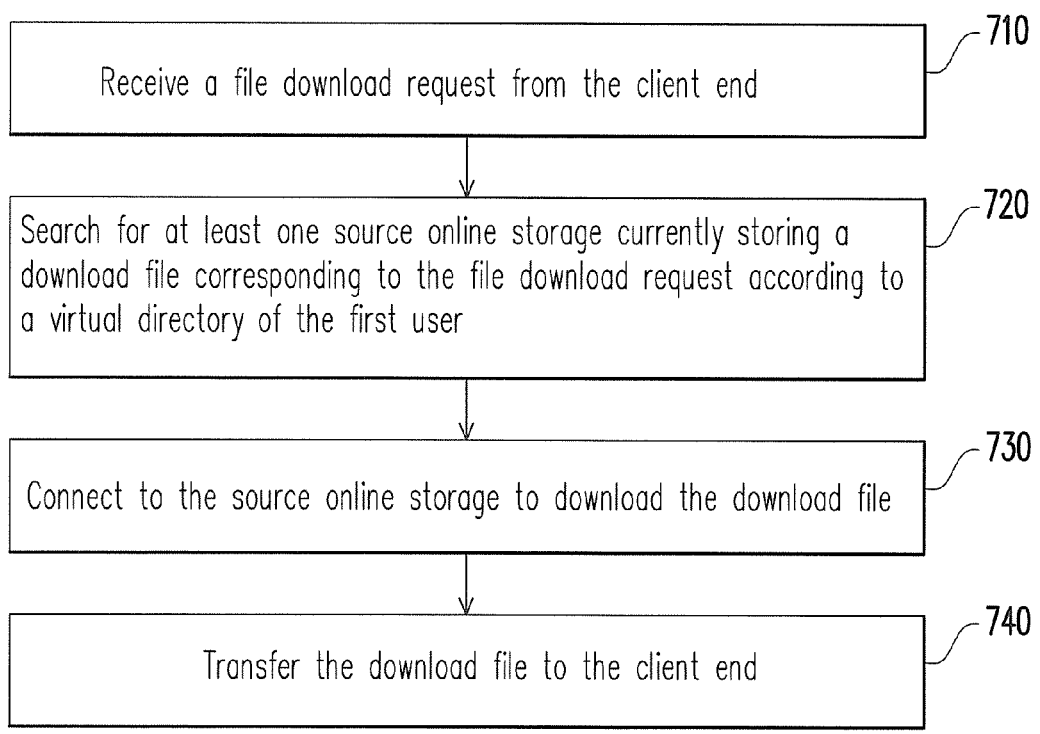
FIG. 7 is a flowchart of a method for sharing online storage services among multiple users according to another embodiment of the invention.

Below, how a user (will be referred to as a first user thereinafter) of the online storage service system 200 (illustrated in FIG. 2) downloads a file stored in the online storage through the online storage service system 200 will be described in detail with reference to FIG. 7.

After the first user connects the corresponding client end to the online storage service system 200 and completes the authentication process, in step 710, the user communication interface 110 receives a file download request from the client end.

Then, in step 720, the file processing module 120 obtains a virtual directory of the first user from the virtual directory database 220 and locates one or more source online storages in which the download file corresponding to the file download request is currently stored according to the virtual directory.

In step 730, the file processing module 120 downloads the download file through the online storage communication interface 130. To be specific, the online storage communication interface 130 connects to foregoing source online storages according to instructions of the file processing module 120 and downloads the download file to the online storage service system 200. In an embodiment, the online storage service system 200 includes an internal storage device (not shown) for temporarily storing the download file. If the download file is compressed and/or encrypted, the online storage communication interface 130 performs a file decompression process and/or a file decryption process on the download file.

Regarding the processed download file, the file processing module 120 determines whether the file obtained by the online storage communication interface 130 is the complete download file or file segments thereof. If the online storage communication interface 130 obtains the file segments, the file processing module 120 performs a file joining process to restore file segments into a complete download file. Finally, in step 740, the user communication interface 110 transfers the download file to the client end.

As described above, the online storage service system 200 integrates and virtualizes online storages signed up by a user at different online storage providers the online storages. When the user uploads or downloads a file through the online storage service system 200, the user can access the online storage services provided by different online storage providers through a single client end connection software or web-based file manager. In the online storage service system 200, the file processing module 120 manages the conversion between virtual file access and physical file access, and the changes made to the file system when a user accesses files through the online storage service system 200 is recorded in the virtual directory of the user. Thus, the user can determine the storage position of a file according to his/her own virtual directory. In another embodiment, the virtual directory of the user is stored in an internal storage device at the client end or a portable storage device (for example, a flash drive) of the user.

Figure 8:
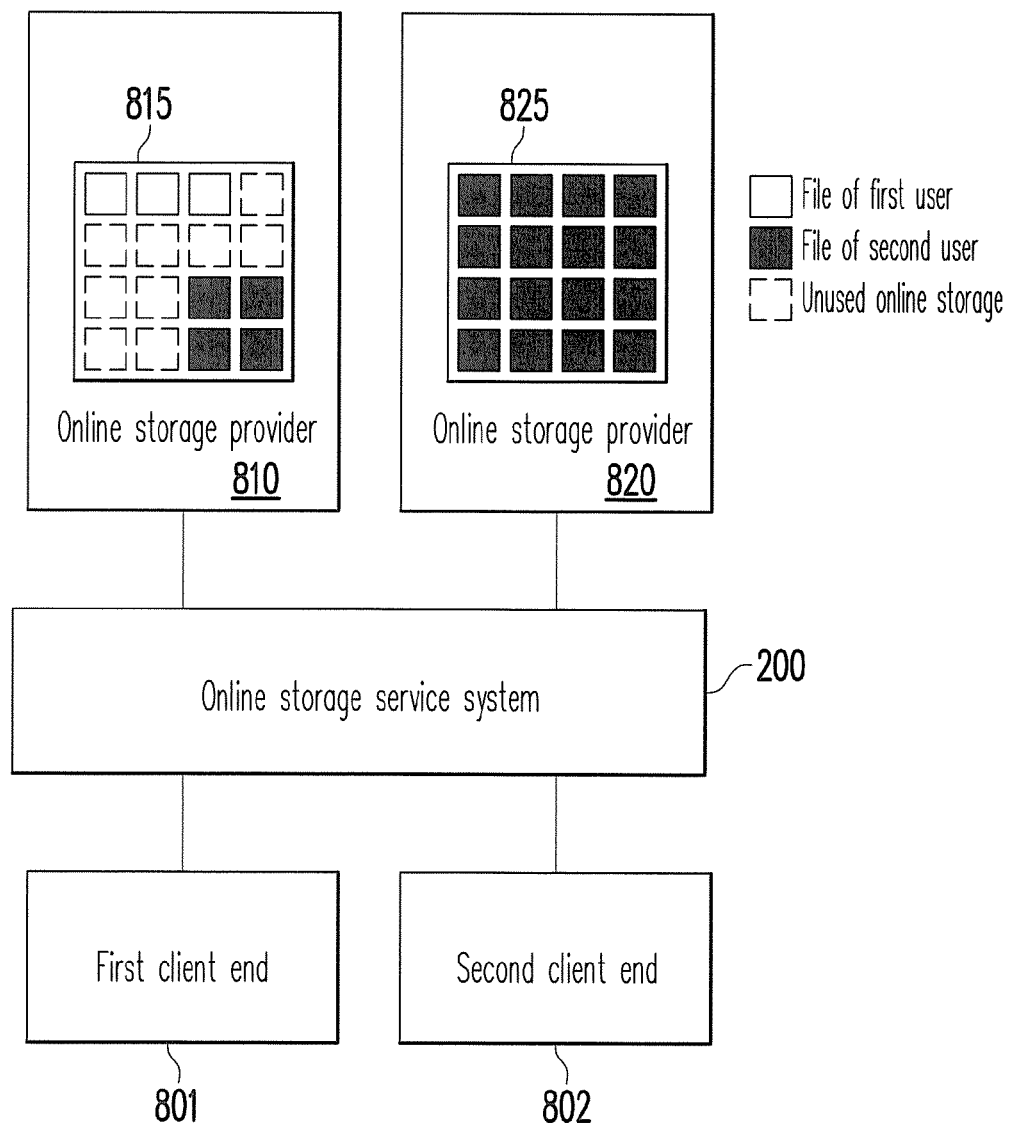
FIG. 8 is a diagram illustrating how online storage services are shared according to an embodiment of the invention.

FIG. 8 is a diagram illustrating how online storage services are shared according to an embodiment of the invention. In the present embodiment, a first user has signed up with a online storage provider 810 to obtain a personal online storage 815, and a second user has signed up with a online storage provider 820 to obtain a personal online storage 825. If the first user and the second user respectively connect to the online storage service system 200 through the corresponding first client end 801 and second client end 802 and belong to the same user group, as shown in FIG. 8, some files of the second user (denoted with black blocks) are stored in the personal online storage 825 of the second user, and some other files of the second user are stored in the online storage provided by the first user through the operation of the online storage service system 200.

Figure 9:
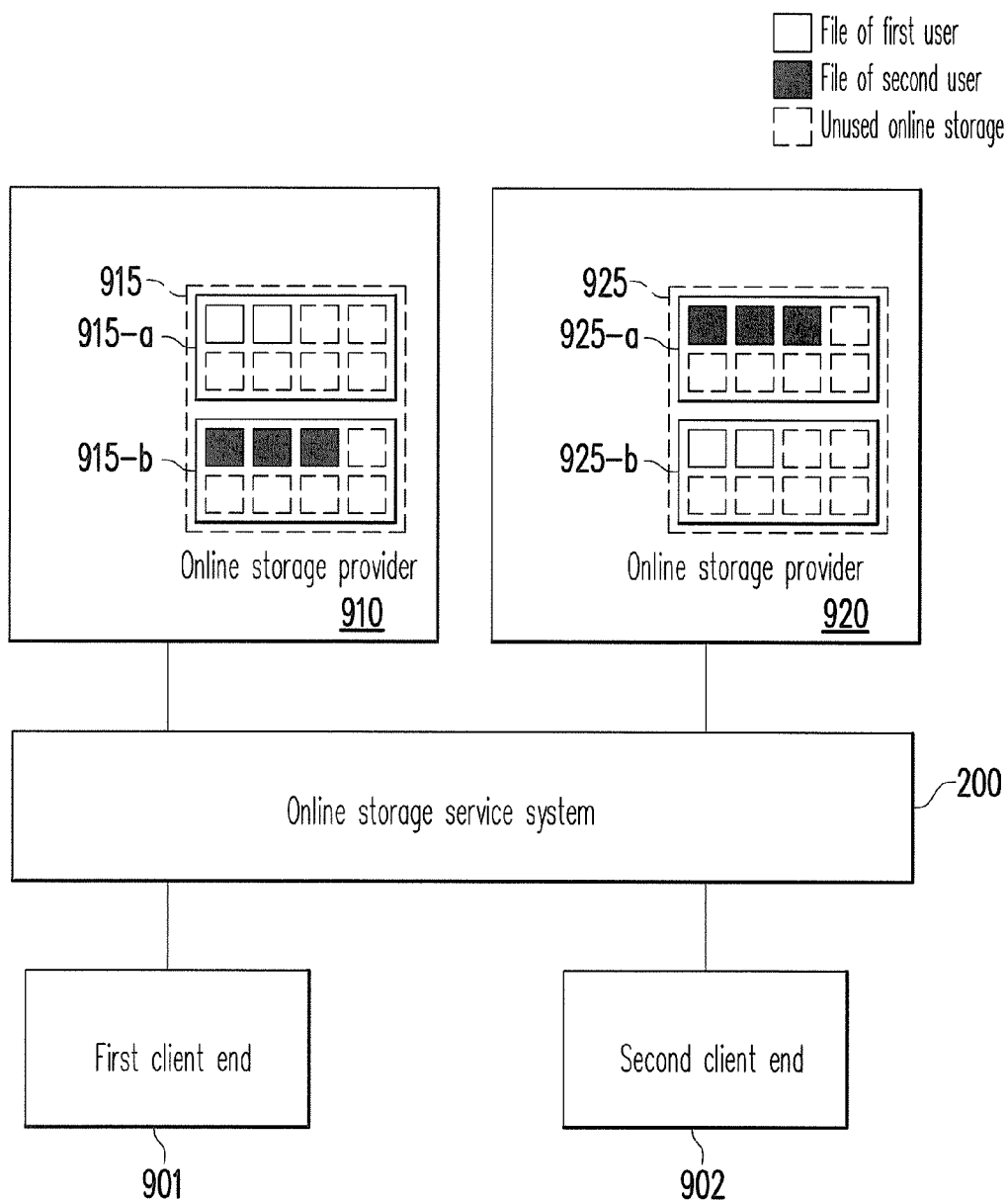
FIG. 9 is a diagram illustrating how online storage services are shared according to another embodiment of the invention.

FIG. 9 is a diagram illustrating how online storage services are shared according to another embodiment of the invention. In the present embodiment, a first user has signed up with a online storage provider 910 to obtain a personal online storage 915, and a second user has signed up with a online storage provider 920 to obtain a personal online storage 925. The first user and the second user respectively connect to the online storage service system 200 through the corresponding first client end 901 and second client end 902 and belong to the same user group. Assuming that the sharing rule set of the user group includes a space exchanging rule (i.e., a sharing manner rule) and a rule that does not allow other users to access a personal file (i.e., a file privacy rule), as shown in FIG. 9, in the personal online storage 915 of the first user, the online storage 915-a is exclusively used for storing files of the first user (only the first user can access the files stored therein), and the online storage 915-b is exchanged to be used by the second user for storing files of the second user. Similarly, in the personal online storage 925 of the second user, the online storage 925-a is exclusively used for storing files of the second user (i.e., only the second user can access the files stored therein), and the online storage 925-b is exchanged to be used by the first user for storing files of the first user. Thereby, when the first user uploads a file through the online storage service system 200, the online storage service system 200 not only stores the file into the online storage 915-a but also stores a copy into the online storage 925-b. Any file uploaded by the second user through the online storage service system 200 is also respectively stored in the online storage 925-a and the online storage 915-b. Accordingly, files can be backed up with different online storage providers, so that the reliability of the files is increased and the privacy of personal data is ensured.

Figure 10:
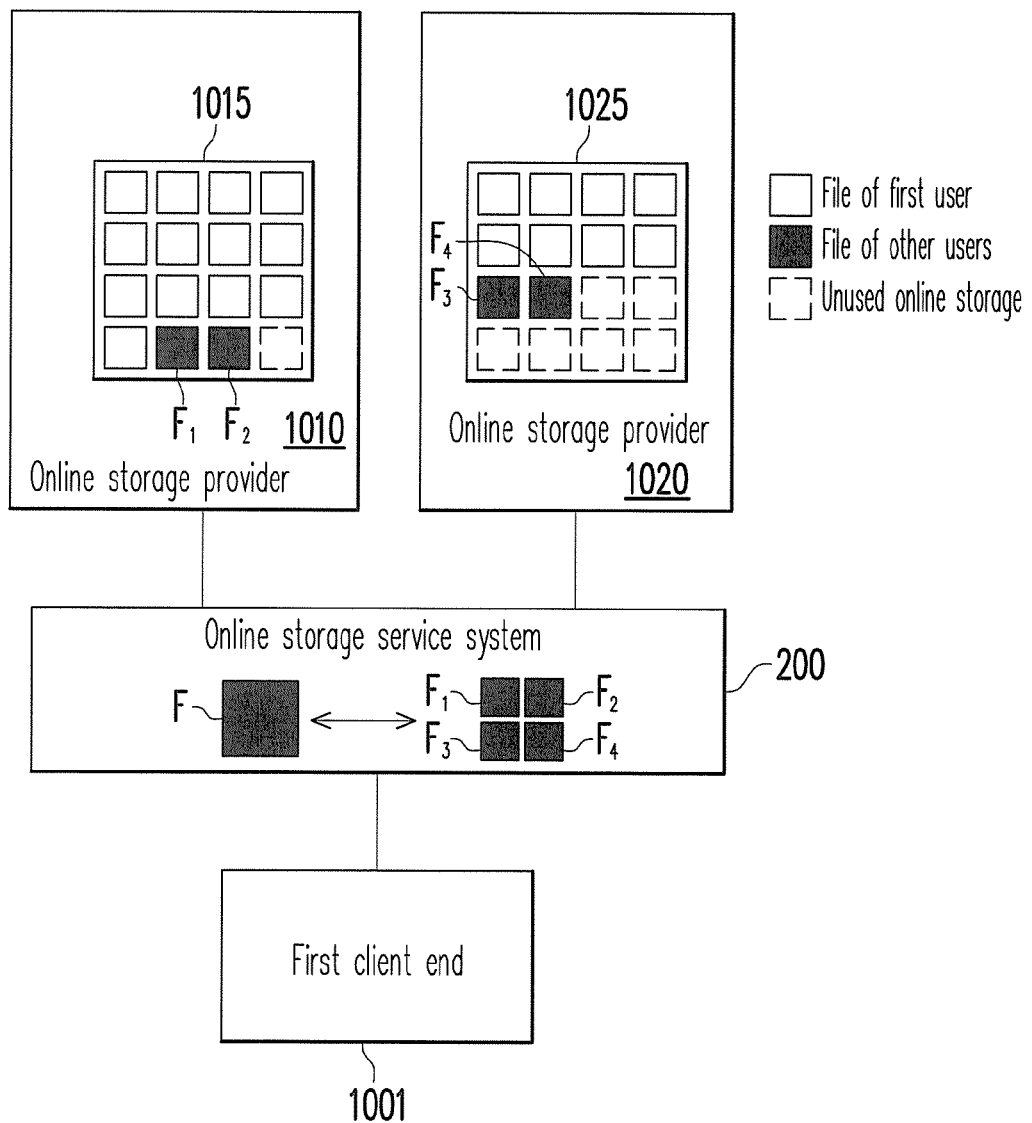
FIG. 10 is a diagram illustrating how online storage services are shared according to yet another embodiment of the invention.

FIG. 10 is a diagram illustrating how online storage services are shared according to yet another embodiment of the invention. In the present embodiment, the online storages available to a first user include a online storage 1015 provided by a online storage provider 1010 and a online storage 1025 provided by a online storage provider 1020. When the first user is about to upload a file F in a first client end 1001, because the size of the file F exceeds the capacity of the free online storage in the online storage 1015, the online storage service system 200 cannot upload the entire file F to the online storage 1015. In the present embodiment, as shown in FIG. 10, the online storage service system 200 splits the file F into smaller file segments F1-F4. After that, the online storage service system 200 respectively stores the file segments F1 and F2 into the online storage 1015 and stores the file segments F3 and F4 into the online storage 1025. Thereby, the limitation on the capacity of online storage provided by a single online storage provider is eliminated, and the privacy of the files can be protected without encrypting the files. When the first user is about to download the file F, the online storage service system 200 connects to the online storage provider 1010 to obtain the file segments F1 and F2 and connects to the online storage provider 1020 to obtain the file segments F3 and F4. After that, the online storage service system 200 combines the file segments F1-F4 and transfers the combined file F to the first client end 1001.

In summary, the invention provides a system and a method for sharing online storage services among multiple users, wherein the online storages respectively signed up by users at different online storage providers are integrated, and related users belonging to the same user group are allowed to share their online storages without jeopardizing the security of the users' personal files. Thereby, the flexibility in using online storage is greatly increased, and the reliability of storing data in online storage is ensured.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for sharing online storage services among multiple users, the method comprising:
   receiving a file upload request and a corresponding upload file from a client end corresponding to a first user;

searching for a personal online storage of the first user and a shared online storage of at least one related user of the first user;

determining to upload the upload file to a partial online storage of the personal online storage and the shared online storage; and transferring the upload file to the partial online storage, wherein the first user belongs to at least one user group, users in the same user group are related users, the personal online storage of the first user and the at least one user group have a correspondence, and each user group has a sharing rule set, wherein the shared online storage provided by the at least one related user in the at least one user group is searched according to the sharing rule set of each user group and the correspondence between the personal online storage of the first user and the at least one user group, wherein when the first user belongs to more than one user group, the personal online storage is partitioned into a plurality of sub spaces, and in the personal online storage, each of the sub spaces is corresponding to one or more of the at least one user group, wherein a sub space among the sub spaces that is corresponding to multiple user groups has a priority when the shared online storage is searched according to the sharing rule set of each user groups.

2. The method according to claim 1, wherein the personal online storage of the first user is partitioned into a plurality of sub spaces, and in the personal online storage, each of the at least one user group is corresponding to one or more of the sub spaces.

3. The method according to claim 1, wherein the sharing rule set comprises a system preset sharing rule set or a user customized sharing rule set.

4. The method according to claim 1, wherein the sharing rule set comprises one or a combination of a sharing period rule, a sharing member rule, a sharing manner rule, a shared space capacity rule, a file privacy rule, and a sharing schedule rule.

5. The method according to claim 1, wherein the step of determining to upload the upload file to the partial online storage of the personal online storage and the shared online storage comprises:

determining the partial online storage of the personal online storage and the shared online storage for uploading the upload file according to a usage log and a virtual directory of the first user, wherein the virtual directory records online storages for storing files uploaded by the first user; and updating the virtual directory according to the partial online storage.

6. The method according to claim 1, further comprising:

receiving a file download request from the client end;

searching for at least one source online storage currently storing a download file corresponding to the file download request according to a virtual directory of the first user; and downloading the download file from the source online storage and transferring the download file to the client end.

7. The method according to claim 1, further comprising one or a combination of following steps:

performing a file rename process;

performing a file splitting/joining process;

performing a file encryption/decryption process; and performing a file compression/decompression process.

8. The method according to claim 1, wherein the personal online storage and the shared online storage are respectively provided by at least one online storage provider.

* * * * *